United States Patent [19]

Iannadrea et al.

[11] 4,204,765

[45] May 27, 1980

[54] APPARATUS FOR TESTING COLORED SECURITIES

[75] Inventors: Gerald Iannadrea, Painesville; Robert L. Gorgone, Mentor; Alan J. Kovach, Cleveland, all of Ohio

[73] Assignee: Ardac, Inc., Willoughby, Ohio

[21] Appl. No.: 858,114

[22] Filed: Dec. 7, 1977

[51] Int. Cl.² .................................................. G01K 9/08

[52] U.S. Cl. .......................................... 356/71; 250/556

[58] Field of Search .................. 356/71; 250/556, 557, 250/571

[56] References Cited

U.S. PATENT DOCUMENTS 3,480,785 11/1969 Aufderheide .......................... 356/71

3,910,701 10/1975 Henderson et al. ................. 356/173

*Primary Examiner*—Vincent P. McGraw

*Attorney, Agent, or Firm*—Oldham, Oldham, Hudak & Weber

[57] ABSTRACT

Apparatus for testing the authenticity of paper having colored areas thereon. A plurality of light emitting diodes, each emitting light of a different wavelength, are provided in juxtaposition to a paper having areas thereon which are reflective with respect to the light from the various diodes. A single photodetector is maintain closely adjacent the paper for receiving light reflected therefrom. A sequential timing circuit controls the illumination of the diodes such that the photodetector senses the light reflective characteristic of the paper with respect to each of the various wavelengths of light in a mutually exclusive manner. The outputs of the photodetector are passed to a sample and hold circuit which, at the end of a test cycle, maintains data relative to the light reflective characteristics of the paper for each of the various wavelengths of light. Comparator circuitry then tests the data and compares the reflectance values for each wavelength against the values for other wavelengths to determine the authenticity of the paper. The diodes may be selected to emit light in either the visible range or at either end of the light spectrum depending upon the nature of the paper to be tested.

8 Claims, 3 Drawing Figures

APPARATUS FOR TESTING COLORED SECURITIES

BACKGROUND OF THE INVENTION

The invention presented herein relates to apparatus for determining the validity of paper securities, currency, documents, and the like. The invention is particularly adapted to be utilized as a secondary test in devices incorporating a suitable primary test such as that utilizing the grid detection technique and apparatus. While the grid detection test has, in the past, been adequate for determining the validity of an instrument purported to be valid, the advent of sophisticated photocopy machines, especially those capable of producing a double-sided copy, has necessitated the utilization of secondary tests for the validity determination. Indeed, many photocopies today are capable of discerning and copying the grid networks generally tested in the primary test.

It has been found that many securities have unique color arrangements upon them and that certain areas thereon are printed with an ink which is either absorptive or transparent to infrared light. Presently known photocopy machines are generally incapable of reproducing colored photocopies and are further incapable of duplicating those areas which are transparent or absorptive to particular types of light such that the reproduced areas exhibit such absorptive or transparent qualities. Consequently, a secondary test to determine the presence of particular colored areas and ink characteristics upon a paper purported to be a valid security provides a means for determining whether or not a paper passing the primary or grid test is indeed a valid instrument of merely a photocopy thereof.

OBJECTS OF THE INVENTION

In light of the foregoing it is an object of the instant invention to provide apparatus for testing colored securities wherein the validity test may be conducted upon colored areas of the security.

It is yet another object of the invention to present apparatus for testing colored securities wherein a validity test may be conducted on the visible light absorptive and reflective characteristics of a security.

Still another object of the invention is to present apparatus for testing colored securities wherein a plurality of tests may be sequentially performed upon the security utilizing a single sensing element.

A further object of the invention is to present apparatus for testing colored securities wherein the presence or absence of various colors and/or inks upon a security may be determined via a single sensing unit.

Yet still another object of the invention is to present apparatus for testing colored securities having the foregoing capabilities and which is simplistic in design, reliable in operation, and inexpensive to construct utilizing state-of-the-art elements.

SUMMARY OF THE INVENTION

The foregoing and other objects of the invention which will become apparent as the detailed description proceeds are achieved by an apparatus for determining the authenticity of a paper, including a tray for receiving and transporting the paper, the improvement comprising: a plurality of light source means in juxtaposition to the tray, each emitting light of a different wavelength, for casting light onto the paper; control means, connected to said light source means, for energizing each such means for fixed time periods; light sensor means in juxtaposition to the paper for receiving light from the paper and producing output signals proportional to the intensity of light of the associated wavelengths received; and circuit means connected to said sensor means and receiving said output signals therefrom for determining the authenticity of the paper as a function of said output signals.

DESCRIPTION OF THE DRAWING

For a complete understanding of the structure and technique of the invention reference should be had to the following detailed description and accompanying drawing wherein.

DETAILED DESCRIPTION OF THE PREFERRED EMBODIMENT

Figure 1:
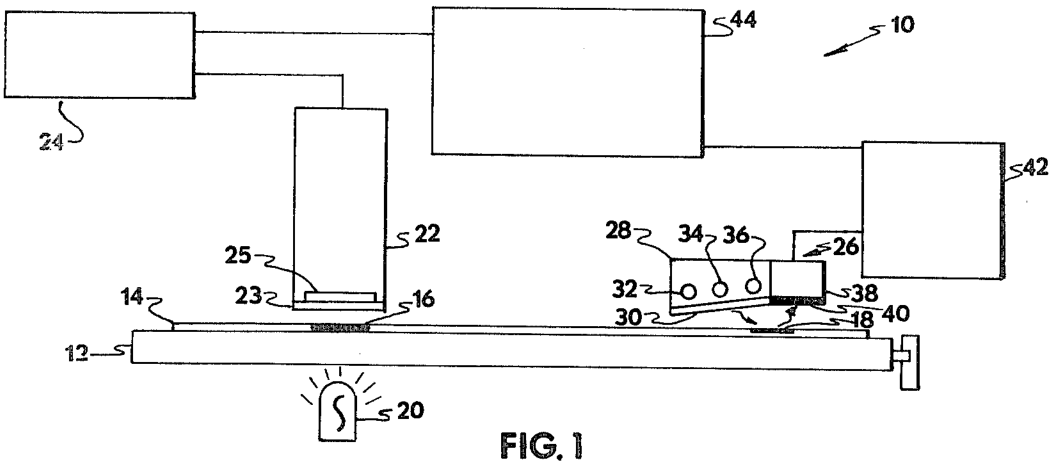
FIG. 1 is a highly functional depiction of a security validation apparatus utilizing the structure of the instant invention.
Figure 2:
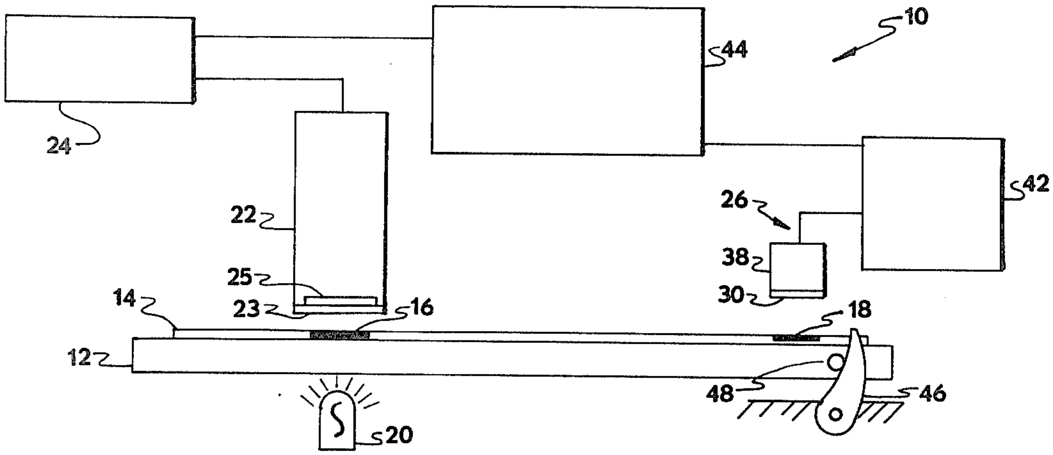
FIG. 2 is a side view of the apparatus shown in FIG. 1.

Referring now to the drawing and more particularly FIG. 1, it can be seen that a security validation system is designated generally by the numeral 10. This system is of the tray acceptor type wherein a tray 12, slidable upon a track or ways, is adaptable for receiving a paper currency, security, or the like, 14, thereupon. The paper 14 is characterized by the presence of a grid pattern 16 on at least one side thereof and is further characterized by an area 18 of one or more colors. As is somewhat standard in the art, the tray 12 is of a transparent material such that light from a lamp 20 may pass therethrough. The lamp 20 is in juxtaposition with the patterned area 16, above which is positioned a reticle detector 22. A reticle or grid network 23 comprises a capping surface of the detector 22 with a photodetector 25 being maintained closely adjacent thereto. The pattern maintained upon the reticle 23 is substantially a mask or negative of the grid pattern 16. Light from the lamp 20 passes through the transparent tray 12 and through certain areas of the grid pattern 16. Relative movement between the paper 14 and reticle detector 22, by movement of either, effectuates a repetitive masking of the grid pattern 16 such that light impinges upon the photodetector 25 in a characteristically blinking fashion. As has been previously accomplished in the art, this blinking is sensed by the primary detection circuit 24 and an initial determination of validity of the paper 14 is made on the basis of the frequency, amplitude, and/or number of light pulses sensed. Upon determining that the paper 14 is indeed a valid instrument via this primary test, a signal is passed from the primary detection circuit 24 to the logic circuitry 44 to be discussed hereinafter.

Also presented as part and parcel of the invention is a secondary detection unit 26 which comprises a lamp casing 28, which may be capped by a lens 30, and maintains therein light emitting diodes (LED's) 32, 34, and 36. A casing 38 is positioned adjacent the casing 28 and contains therein a photodetector 40. It will be appreciated that the secondary detection unit 26 may be of various physical configurations such as that having the photodetector 40 centrally located, with the lamps or LED's 32-36 being circumferentially spaced thereabout, in which case the casing 28 would be of an annular nature. Regardless of the particular configuration of the unit 26, the LED's 32-36 and associated lens 30 are positioned and/or angled in such a manner that light from the lens is directed upon the surface 18 such that light is reflected therefrom back upon the photodetector 40. In the particular embodiment shown, it can be seen that the lens 30 is angled to direct light toward this surface.

Connected to and receiving signals from the photodetector 40 is the reflection detection circuitry 42 to be discussed hereinafter. Suffice it to say that the circuitry 42 makes a determination from the signals received from the photodetector 40 whether or not to what degree certain colors are present within the area 18. Information in this regard is passed from the circuitry 42 to the logic circuitry 44 mentioned hereinabove.

Actuation of the primary and secondary detection units 24,26 may be achieved in any of numerous manners. It has been previously known in the art of tray acceptor validation apparatus to utilize a microswitch 46 maintained upon, for example, the housing of the system 10, which is actuated by a pin 48 maintained upon the movable tray 12. Of course, the switch 46, pin 48, and detectors 22,26 are positioned in such a manner that at the time of actuation of the switch 46 via the pin 48, the detectors 22,26 are respectively opposite the areas 16,18.

As will be appreciated hereinafter, it is also contemplated by the instant invention that several pins could be positioned upon the tray 12 if plural readings were to be taken by the unit 26. That is, if several areas of color existed upon the paper 14 and such areas were desired to be tested, then such tests could be made while the tray 12 is being slid into position. For example, a first pin could actuate the microswitch 46 to test both the grid pattern 16 and a second colored area 18. In any case, a number of testing arrangements can readily be conceived for utilization by the structure presented herein.

Figure 3:
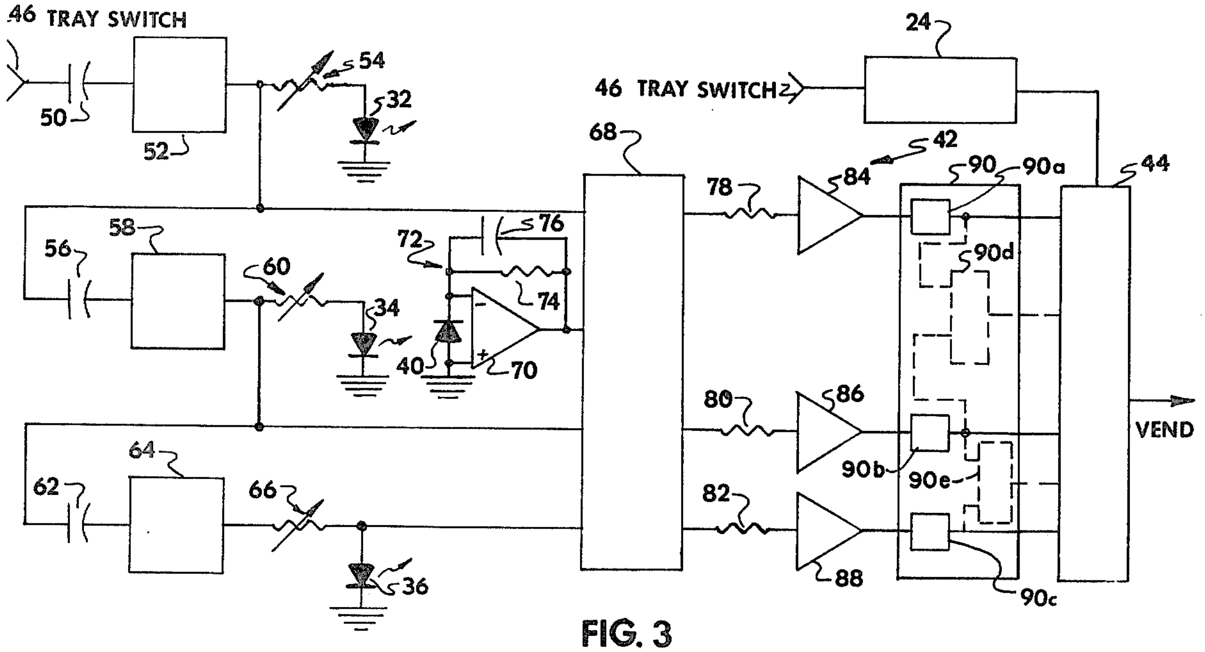
FIG. 3 is a circuit schematic of the circuitry of the invention.

Referring now to FIG. 3, the detailed circuitry of the reflection detection circuit 42 may be seen. A signal from the tray switch 46 is coupled through the coupling capacitor 50 to excite the timer 52 which emits an output to illuminate the LED 32. A variable resistor 54 is provided for purposes of regulating the current to the LED 32 and hence the intensity of the light emitted therefrom. It should be understood to those skilled in the art that the duration of the output from the timer 52 may be established by proper selection and/or adjustment of an RC network in the timer output circuit (not shown). In any event, the LED 32 is illuminated for a fixed period of time. When the timer 52 times out, the terminal transition of its output signal causes an excitation of the timer 58 via the coupling capacitor 56. This timer, similar to the timer 52, then emits an output of a fixed time duration. This output passes through the variable resistor 60, functioning as the variable resistor 54, to illuminate the LED 34. Similarly, concurrent with the terminal transition of the output from the timer 58, excitation of the timer 64 is accomplished via the capacitor 62. The timer 64 emits an output signal of fixed time duration which, under control of the variable resistor 66, illuminates the LED 36. With excitation of the times, 58,64 being accomplished by the termination of the output of the preceding timer, there is no overlapping of LED illumination, but the LED's are illuminated sequentially and separately and distinctly from each other. Thus, the entire test cycle, equal to the summation of illumination times of the timers 52,58,64, is minimized. Of course, a clock-count-decode approach to the timing sequence could easily be used, and provisions could be made for short quiescent periods between the period of illumination of the various LED's. In any event, the LED's are illuminated for very short periods of time and may thus be driven with high currents to provide correspondingly high levels of light output.

The photodetector 40 is interconnected in the short circuit mode of operation to the amplifier 70 having a feedback network 72 comprising resistor 74 and capacitor 76 functioning in the standard manner. The photodetector 40 senses the light reflected from the surface 18 of the paper 14 and, via the amplifier 70, applies a signal indicative of the intensity of such light reflectance to the data selector or data gate 68. It can be seen that the date gate 68, having a single input from the amplifier 70, gates that input to one of three outputs. When a signal is emitted from the timer 52, this signal gates the output of the amplifier 70 through the resistor 78 into the peak detector 84. This signal is indicative of the amount of light reflectance from the area 18 resulting from illumination of the LED 32. Similarly, with an output from the timer 58, the light reflectance from the area 18 is sensed by the photodetector 40 and a corresponding signal is gated from the amplifier 70 through the resistor 80 and to the peak detector 86. A signal from the timer 64 allows a signal indicative of the light reflectance from the area 18 resulting from illumination of the LED 36 to be passed through the resistor 82 into the peak detector 88. Thus, each of the peak detectors 84,86,88 receive data indicative of the light reflectance from the area 18 resulting from illumination of the associated LED.

The outputs of the peak detectors 84,86,88 are applied to the sample and hold circuit 90 which functions in the standard fashion. With the data stored in the respective sample and hold circuits 90a-90c, any number of tests may be conducted to determine the authenticity of the paper. A logic circuit 44 is interconnected to the sample and hold circuit 90 to receive the data therefrom and perform a secondary test for validation on the paper 14 on the basis of the data acquired and stored in the circuit 90. It should be readily appreciated by those skilled in the art that the circuitry 44 can be of a rather simplistic nature seeking to determine the presence or absence of certain colors within the area 18 as determined by the signal strength indicated in the storage circuit 90. If, for example, the LED's 32,34,36 respectively emitted yellow, blue, and red light, and if the area 18 was characterized by the presence of green and purple ink, a test could be developed as follows. When the yellow lamp 32 is illuminated, the green portion of the area 18 would reflect a determinable amount of yellow light and absorb the rest. Similarly, with the blue lamp 34 illuminated, the green and purple areas would reflect a predetermined amount of the blue light and absorb the rest. With the red LED 36 illuminated, the purple area would reflect a certain amount of light with the rest being absorbed by the area 18. By testing and averaging the amount of light reflectance of the area 18 on each of a number of valid papers 14, a determination may be made of the values of light to be reflected for each of the LED's 32-36 in a valid paper. The logic circuitry 44 may be developed accordingly and is well within the skill of one versed in the art. It should be appreciated that the utilization of mutually exclusively operated LED's of various colors obviates the necessity of light filters and allows a single unfiltered photodetector 40 to sense light reflectance of various colors.

To compensate for aging or "graying" of the paper 20 or degradation of the functioning of the system in general, tests of relative values may be devised. Here, a predetermination is made as to the relative values of light reflectance from the area 18 for each of the colored LED's 32-36. Regardless of age or wear having been experienced by the paper 10, or the dust and dirt existent upon the lens 30, the relative value should not fail in making an accurate determination of validity. Hence, the circuit 90 could readily include comparator circuitry to weight relative values. As shown in phantom, comparators **90*d* and 90*e* can be connected such that the outputs of the peak detectors 84,88 are compared to the output of the peak detector 86 with each of the comparators 90*d*, 90*e* providing an output to the logic circuit 44 for the final determination as to validity. Of course, any of numerous such relative comparisons may be made. In any event, regardless of the comparison method of the circuit 90, with a determination having been made as to the reflectance of colored light from the area 18 of the paper 14, logic circuitry 44** may be devised to test the validity of the paper as a function thereof.

The LED's 32,34,36 need not be of a visible light emitting nature. Indeed, as mentioned above, the area 18 may include a portion printed with ink which is either absorptive or transparent with respect to infrared light. In such a case, one of the LED's may be an infrared LED with the area 18 then exhibiting a characteristic reflectance as a result of the presence of such ink.

The logic circuit 44 is also fed by the primary detection circuit 24, and if the former receives a signal indicating validity from the latter, and if the latter also determines from the value maintained in the sample and hold circuit 90 that the paper is valid, then the circuit 44 produces an output signal indicating that the paper is indeed what it purports to be and the paper is accepted. In a currency changer, a signal may be emitted to direct the vending of change upon such a determination of validity.

Thus it can be seen that the objects of the invention have been met by the structure presented hereinabove. Though the invention has been described in a reflective mode with the photodetector 40 sensing light reflected from the surface of the paper 14, it could equally well operate in a transmissive mode with the paper 14 interposed between the photodetector 40 and diodes 32-36, and such mode is included as part of the invention herein. While in accordance with the patent statutes only the best mode and preferred embodiment of the invention has been presented and described in detail, it is to be understood that the invention is not limited thereto or thereby. Consequently, for an appreciation of the true scope and breadth of the invention reference should be had to the following claims.

What is claimed is:

1. In an apparatus for determining the authenticity of a paper, including a tray for receiving and transporting the paper, the improvement, comprising:
   - a plurality of light source means in juxtaposition to the tray, each emitting light of a different wavelength, for casting light onto the paper;
   - control means connected to said light source means for energizing each such means for a fixed time period;
   - light sensor means in juxtaposition to the paper for receiving said light from the paper and producing output signals proportional to the intensity of light of the associated wavelengths received; and
   - circuit means conncted to said sensor means and receiving said output signals therefrom for determining the authenticity of the paper as a function of said output signals, said circuit means comprising:
     - a gating circuit interconnected between said light sensor means and said control means, said gating circuit having a plurality of outputs and gating each of said output signals to a particular one of said plurality of outputs under control of said control means;
     - a plurality of holding circuits connected to respective outputs of said gating circuit and receiving and maintaining the peak value of an associated output signal;
     - a logic circuit connected to said holding circuits, receiving said peak values and determining therefrom the authenticity of the paper; and
     - comparator circuits interconnected between pairs of said holding circuits, receiving said peak values therefrom, and comparing said pairs of peak values with each other.

2. The apparatus as recited in claim 1 wherein said control means sequentially energizes each of said plurality of light source means.

3. The apparatus as recited in claim 2 wherein said control means comprises a plurality of series-connected timing circuits, each connected to an associated light source means, a first of said plurality of timing circuits being actuated by the tray and succeeding timing circuits being actuated by outputs from the preceding timing circuit.

4. The apparatus as recited in claim 1 wherein each of said light source means comprises a light emitting diode and wherein said light sensor means comprises a photodetector.

5. The apparatus as recited in claim 1 wherein said control means illuminates said light sources in a mutually exclusive manner.

6. A device for determining the authenticity of a paper, comprising:
   - a plurality of light sources in juxtaposition to said paper, each capable of emitting light of a different wavelength;
   - a timing circuit connected to said light sources, said timing circuit mutually exclusively illuminating said light sources for casting light onto the paper;
   - a single photodetector in juxtaposition to said paper and receiving light therefrom, said photodetector producing output signals, indicative of light received from the paper from said light sources; and
   - circuit means comprising:
   - a gating circuit connected to said photodetector and said timing circuit, and a plurality of holding circuits, one associated with each light source, connected to said gating circuit, said gating circuit gating said output signals from said photodetector to the holding circuit associated with the light source effectuating said output signal;
   - a logic circuit connected to said holding circuit and determining the authenticity of said paper as a function of said output signals; and comparator circuits interconnected between pairs of said holding circuits and comparing, in pairs, said output signals, said comparison being indicative of the authenticity of the paper.

7. The device according to claim 6 wherein said light sources and photodetector are maintained in a single housing, said photodetector sensing light reflected from the paper.

8. The device according to claim 6 wherein said plurality of light sources each illuminate the same area of the paper.

* * * * *